United States Patent
Hoppe

(10) Patent No.: US 7,116,003 B2
(45) Date of Patent: Oct. 3, 2006

(54) AIRCRAFT STARTER/GENERATOR ELECTRICAL SYSTEM WITH MIXED POWER ARCHITECTURE

(75) Inventor: Richard J. Hoppe, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 187 days.

(21) Appl. No.: 10/890,740

(22) Filed: Jul. 14, 2004

(65) Prior Publication Data

US 2006/0012177 A1  Jan. 19, 2006

(51) Int. Cl.
- F02B 63/04 (2006.01)
- H02K 7/18 (2006.01)
- H02P 3/00 (2006.01)
- H02P 9/06 (2006.01)
- H02P 15/00 (2006.01)

(52) U.S. Cl. ......................................... 290/1 A; 322/10
(58) Field of Classification Search ................. 290/1 A; 322/10
See application file for complete search history.

(56) References Cited

U.S. PATENT DOCUMENTS

| | | | | |
|---|---|---|---|---|
| 3,873,900 A | * | 3/1975 | Sommer et al. | 388/820 |
| 3,902,073 A | * | 8/1975 | Lafuze | 290/46 |
| 4,160,939 A | * | 7/1979 | Damouth et al. | 318/723 |
| 4,223,261 A | * | 9/1980 | White | 318/721 |
| 4,330,743 A | * | 5/1982 | Glennon | 290/46 |
| 4,403,292 A | * | 9/1983 | Ejzak et al. | 700/297 |
| 4,456,830 A | * | 6/1984 | Cronin | 290/27 |
| 4,481,459 A | * | 11/1984 | Mehl et al. | 322/10 |
| 4,645,940 A | * | 2/1987 | Wertheim | 307/66 |
| 4,731,572 A | * | 3/1988 | Bolie | 318/721 |
| 4,786,852 A | * | 11/1988 | Cook | 322/10 |
| 4,967,096 A | * | 10/1990 | Diemer et al. | 307/19 |
| 5,097,195 A | * | 3/1992 | Raad et al. | 322/10 |
| 5,281,905 A | * | 1/1994 | Dhyanchand et al. | 322/32 |
| 5,512,811 A | * | 4/1996 | Latos et al. | 322/10 |
| 5,587,647 A | * | 12/1996 | Bansal et al. | 322/45 |
| 5,656,966 A | * | 8/1997 | Wilmot et al. | 327/440 |
| 5,764,036 A | * | 6/1998 | Vaidya et al. | 322/90 |
| 6,344,700 B1 | * | 2/2002 | Eisenhauer et al. | 307/64 |
| 6,507,506 B1 | * | 1/2003 | Pinas et al. | 363/79 |
| 6,992,403 B1 | * | 1/2006 | Raad | 307/47 |
| 7,019,413 B1 | * | 3/2006 | Kinoshita | 290/4 R |
| 7,050,303 B1 | * | 5/2006 | Park et al. | 361/715 |

* cited by examiner

Primary Examiner—Darren Schuberg
Assistant Examiner—Pedro J. Cuevas
(74) Attorney, Agent, or Firm—Stephen G. Mican

(57) ABSTRACT

A starter/generator electrical system for gas turbine powered aircraft with mixed power architecture to combine advantages of each. The mixed power architecture may be selected from constant frequency (CF), adjustable variable frequency (AVF) and narrow range variable frequency (NRVF) alternating current (AC) systems to suit aircraft requirements for on-board electric components and redundancy, with at least two separate power generation systems provided for each gas turbine engine on the aircraft.

7 Claims, 3 Drawing Sheets

AIRCRAFT STARTER/GENERATOR ELECTRICAL SYSTEM WITH MIXED POWER ARCHITECTURE

FIELD OF THE INVENTION

The invention relates to electrical systems for gas turbine powered aircraft that utilise starter/generator systems, and more particularly aircraft electrical systems that comprise a mixed power architecture.

BACKGROUND OF THE INVENTION

Many aircraft that use gas turbine engines for propulsion have commonly used pneumatic starters. Such aircraft have an accessory turbine air motor coupled to each propulsion engine through a gearbox with reduction gearing to crank the propulsion engine.

Compressed air, supplied by a load compressor that is part of an on-board auxiliary power unit (APU) or an external ground cart, supplies compressed air to the turbine air motor through a pneumatic starter supply system that requires numerous air ducts, seals and air valves that are bulky and heavy. Furthermore, such pneumatic starter supply systems are complex, and such complexity reduces the reliability of the aircraft and increases maintenance costs.

In recent years, electric starters have been considered for cranking gas turbine propulsion engines. Incorporating an electric start capability does not appreciable add to the cost, weight and complexity of the electrical system since the infrastructure exists and an electrical starting system can make use of the existing components and wiring.

Although a dedicated electric starter motor with a suitable overriding clutch and associated reduction gearing in the gearbox can be used as part of the electrical starting system, the most desirable approach is to use a single dynamoelectric machine that is alternatively operable as a generator or a starter motor to eliminate the need for separate machines, multiple mounting pads, additional reduction gearing in the gearbox, the overriding clutch and associated ducting and valves. Such an approach is commonly referred to as a "starter/generator" system, and such systems have been available in various forms for a number of years.

Typically, high-power electronic control equipment has been necessary to make such starter/generator systems operational in ordinary aeronautical applications. Since most aircraft architectures require alternating current for supplying on-board electrical components, such as fans, motors, pumps and electronics, an alternating current (AC) generator is generally used as a starter/generator. A high power motor controller must be used to convert the available electrical power for starting to a variable frequency AC power supplied to the starter/generator to bring the engine up to self-sustaining speed, after which the starter/generator is used in its conventional mode as a generator.

Additionally, since most on-board AC components require a power source with an AC frequency that is constant or within a range of frequencies and the AC power from the starter/generator is proportional to engine speed that may vary over a wide range, high power variable frequency (VF) to constant frequency (CF) conversion equipment is generally required. Such conversion equipment generally converts the VF AC power from the generator to direct current (DC) power and then converts the DC power to CF AC power.

The use of such high-power motor controllers and power conversion equipment increases cost, weight and complexity of the starter/generator system and it reduces reliability.

Thus, an alternative approach, as described in Kandil et al., U.S. Ser. No. 10/154,942, filed May 24, 2002, commonly owned by the assignee of this application and incorporated by reference, eliminates the use of high power motor control and power conversion equipment as part of the starter/generator by using a unique mechanical coupling system between the starter/generator and the engine that comprises a torque converter coupling the starter/generator to the engine for starting the engine and a constant speed transmission or drive coupling the engine to the starter/generator for generating power once the engine has reached self-sustaining speed.

The system as described in Kandil et al. is quite satisfactory for aircraft architectures that have all on-board electrical components operating at CF AC. However, some new architectures have on-board electrical components that require an adjustable range of frequencies, such as environmental control system (ECS) motors. The frequency of AC power for such components is adjusted according to flight conditions and requirements. For instance, the power frequency for such ECS motors changes to vary the speed of the motors to suit flight conditions as required by the ECS.

The use of the Kandil et al. starter/generator system in aircraft architectures that require adjustable VF AC power requires conversion of CF AC power to adjustable VF (AVF) AC power. Since electrical equipment, such as ECS motors, that require such AVF AC power can have significant power requirements, high power CF to AVF conversion equipment is necessary for their operation. This increases cost, weight and complexity of the system.

A co-pending application by Hoppe et al., owned by the assignee of this application and incorporated by reference, describes a starter/generator system for a gas turbine engine used in aeronautical applications that couples a single dynamoelectric machine to the gas turbine engine through a torque converter in a starting mode, and then disengages the torque converter and engages the engine to the dynamoelectric machine through an adjustable speed transmission in a generating mode after the engine reaches self-sustaining speed, wherein the speed of the adjustable speed transmission is set to match the frequency of AC generated by the dynamoelectric machine with on-board electrical equipment requirements to suit flight conditions. This system is very satisfactory for such aircraft architectures that require AVF AC power. However, in aircraft architectures that can tolerate a non-adjustable narrow range variable frequency (NRVF) AC power system, this approach is also overly complex, heavy and costly.

A co-pending application by Thomson et al., owned by the assignee of this application and incorporated by reference, describes a starter/generator system for a gas turbine engine used in aeronautical applications that couples a single dynamoelectric machine to the gas turbine engine through a torque converter in a starting mode and engages the engine to the dynamoelectric machine through a mechanical differential in a generating mode after the engine reaches self-sustaining speed and combines the output of the engine and the torque converter in the differential to regulate the frequency of AC generated by the dynamoelectric machine within a range of frequencies suitable for on-board electrical equipment by dynamically regulating the flow of hydraulic fluid to the torque converter.

Although the various architectures for starter/generator electrical systems as described above each have their advantages, selection of a single architecture is sometimes less than ideal. For instance, selection of a CF AC power system may seem necessary if a substantial number of on-board electrical components require CF AC. However, if AVF AC is required for other on-board components, such as the ECS motors, then high power CF to AVF conversion equipment is necessary for their operation. This increases cost, weight and complexity of the system.

Likewise, selection of a NRVF AC starter/generator system may seem wise when a substantial number of on-board electrical components tolerate a band of AC frequency power. The use of a NRVF AC starter/generator system architecture as described in Thomson et al. can greatly reduce cost, weight and complexity of the system. However, if some of the on-board components require AVF AC power, then the necessary high power NRVF to AVF conversion equipment offsets any advantage in reduced weight, cost and complexity of the NRVF system.

SUMMARY OF THE INVENTION

The invention comprises a starter/generator electrical system for gas turbine engine powered aircraft with mixed electrical power architecture to combine advantages of each. The mixed power architecture may be selected from CF, AVF and NRVF AC systems to suit aircraft requirements for on-board electric components and redundancy, with at least two separate power generation systems provided for each gas turbine engine on the aircraft. For instance, each aircraft gas turbine engine may provide the combination of AVF AC power and CF AC power generation, with each type of power generation system sized for respective on-board electrical component needs. Likewise, each gas turbine engine by have the combination of AVF and NRVF AC power or independent multiple AVF AC power starter/generator systems for redundancy. Typically, an AVF AC system is used in such a mixed architecture for starting the engines.

In a preferred embodiment, the starting and generating system for gas turbine engine powered aircraft comprises: a first electrical power generation system coupled to each engine that provides adjustable variable frequency (AVF) alternating current (AC) comprising a dynamoelectric machine for starting the engine and generating electrical power for a first group of on-board electrical components that require AVF AC power; a first electrical power bus coupled to each first electrical power generation system for distributing power from its respective first electrical power generation system to the first group of on-board electrical components; a second electrical power generation system coupled to each engine for generating electrical power for a second group of on-board electrical components; and a second electrical power bus coupled to each second electrical power generation system for distributing power from its respective second electrical power generation system to the second group of on-board electrical components.

DETAILED DESCRIPTION OF THE INVENTION

Figure 1:
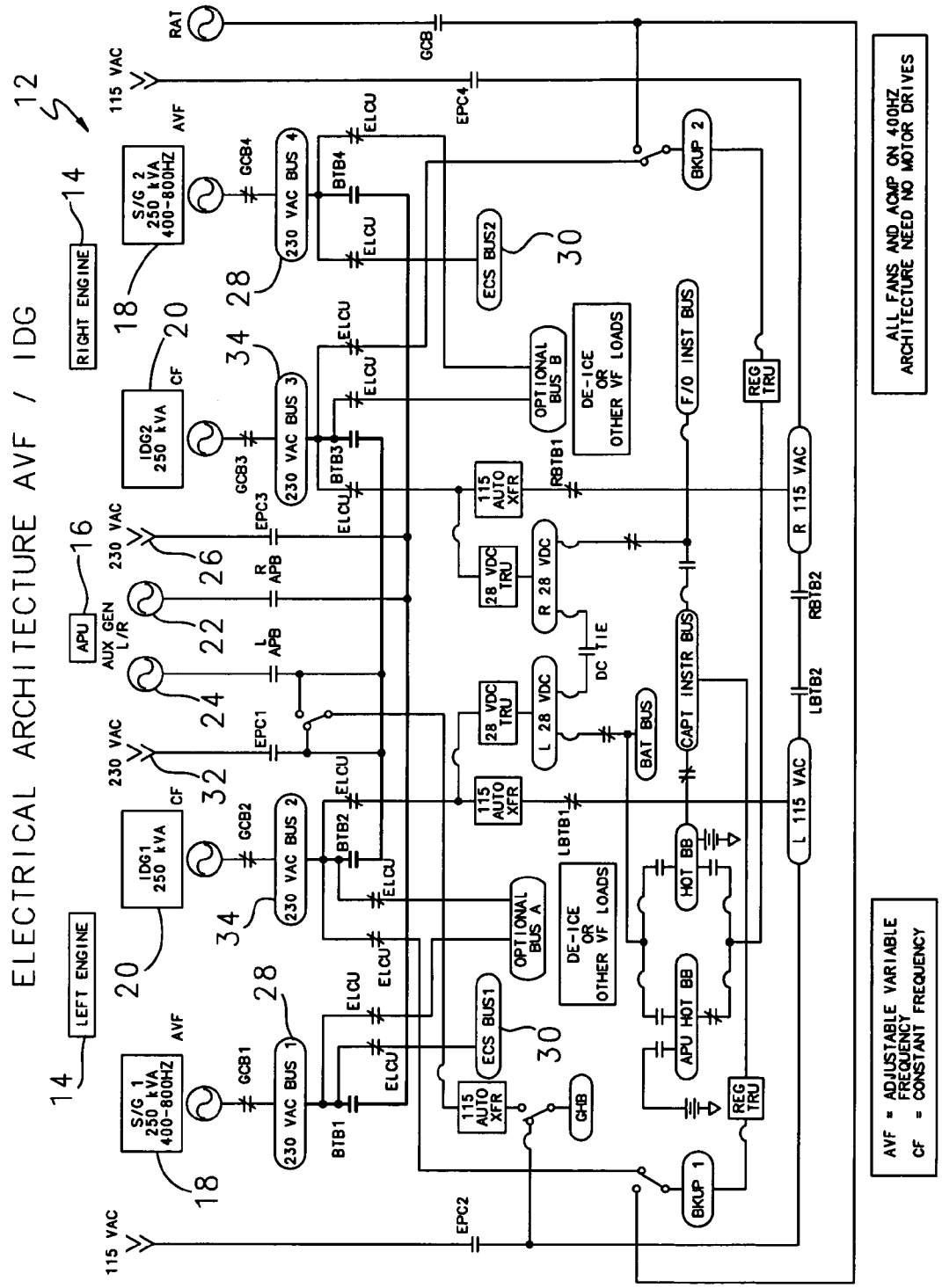
FIG. 1 is a schematic representation of an aircraft starter/generator electrical system that has AVF AC and CF AC mixed power architecture.

FIG. 1 is a schematic representation of an aircraft starter/generator electrical system 12 that has AVF AC and CF AC mixed power architecture. As shown by way of example, the system 12 comprises an architecture for an aircraft that has two gas turbine powered propulsion engines 14 and an auxiliary power unit (APU) 16, although the system 12 may be used with other aircraft configurations, as shall be appreciated by those skilled in the art.

Each of the engines 14 couples to an AVF AC starter/generator system 18, such as the AVF AC starter/generator system described in Hoppe et al., and a conventional CF AC generation system 20. Likewise, the APU 16 has an AVF power generation system 22 and a CF AC power generation system 24.

Each of the engines 14 may be started by AC power supplied by the AVF AC power generation system 22 of the APU 16 or an external AC power source, such as a ground cart, through an AVF AC port 26. The AVF AC power is coupled to the AVF AC starter/generator 18 of each engine 14 through respective AVF AC power buses 28. The AVF AC power generation system 22 may also be used to power on-board electrical components that require AVF AC power, such as ECS motors. Such components are coupled to each AVF AC power bus 28 through a respective AVF AC components power bus 30.

In addition, during start-up, on-board electrical components that require CF AC may be supplied power by the CF AC generation system 24 or an external AC power source, such as a ground cart, through a CF AC port 32. The CF AC power is coupled to the on-board CF AC components through CF AC power buses 34 for each CF AC power generation system 20.

As each engine 14 reaches self-sustaining speed, its respective AVF AC starter/generator system 18 generates power through its respective AVF AC power bus 28 for use by on-board AVF AC electrical components. Similarly, the CF AC power generation system 20 for each engine 14 generates power through its respective CF AC power bus 34 for use by on-board CF AC electrical components.

Advantages of the mixed architecture AVF/CF starter/generator electrical system 12 are three fold. First, the AVF starter/generator system 18 for each engine 14 allows electric starting so that no separate pneumatic starting system is required. That allows the use of a no-bleed air design for the aircraft. Second, the AVF AC power starter/generators provide AVF AC power to high-power on-board electrical components that require AVF AC power according to flight requirements, such as ECS motors, thus eliminating the need for large motor controllers in the architecture. Third, the CF AC generation systems 20 for each engine 14 provide CF AC power to the remainder of the on-board electrical components, such as fans, pumps and on-board electronics, thereby allowing the design of these components to be optimised for CF AC power.

Figure 2:
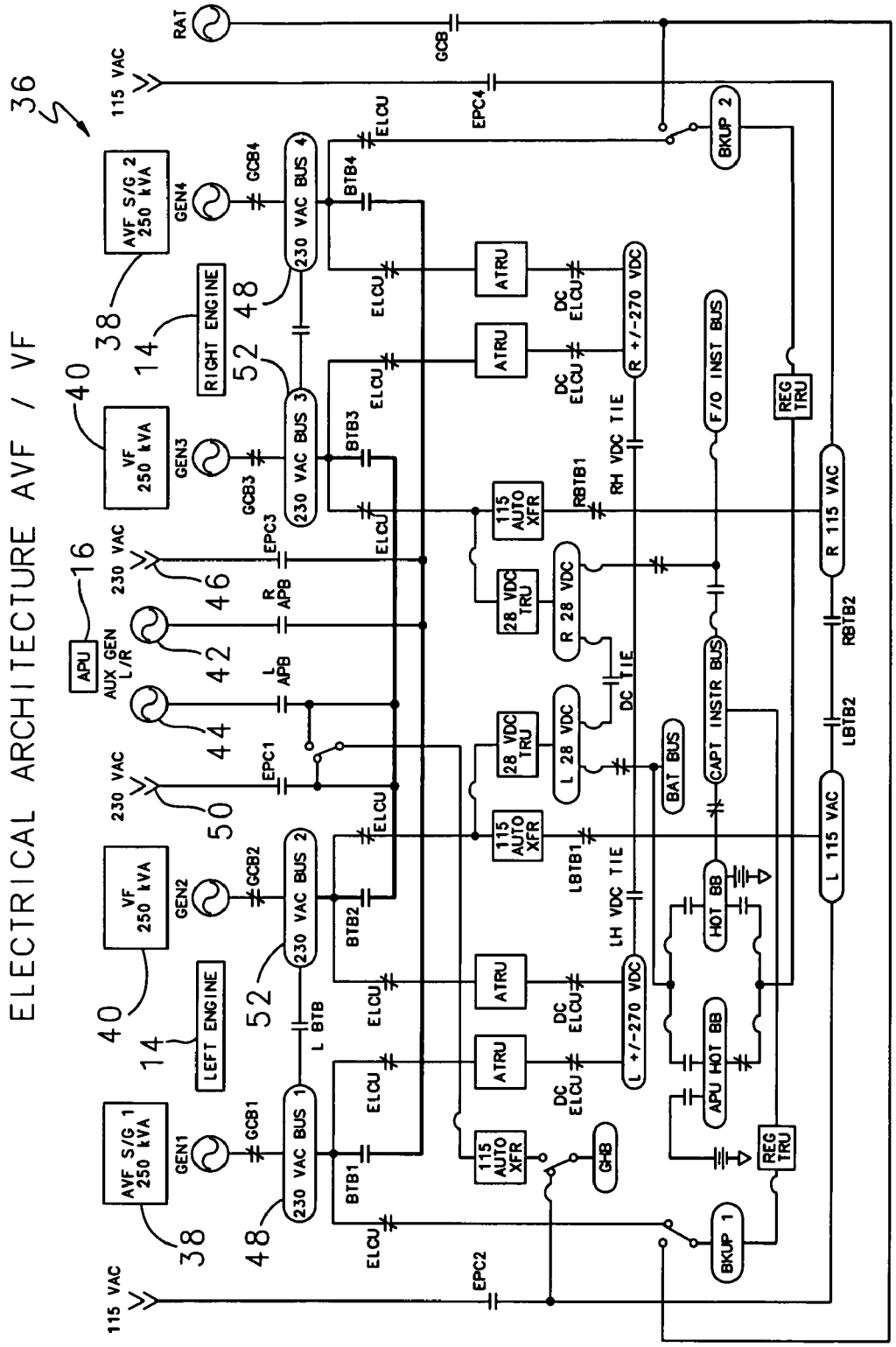
FIG. 2 is a schematic representation of an aircraft starter/generator electrical system that has AVF and NRVF AC mixed power architecture.

FIG. 2 is a schematic representation of an aircraft starter/generator electrical system 36 that has AVF and NRVF AC mixed power architecture. As shown by way of example, the system 36 comprises an architecture for an aircraft that has two gas turbine powered propulsion engines 14 and an auxiliary power unit (APU) 16, although the system 32 may be used with other aircraft configurations, as shall be appreciated by those skilled in the art.

Each of the engines 14 couples to an AVF AC starter/generator system 38, such as the AVF AC starter/generator system described in Hoppe et al., and a conventional VF AC generation system 40. Likewise, the APU 16 has an AVF power generation system 42 and a VF AC power generation system 44.

Each of the engines 14 may be started by AC power supplied by the AVF AC power generation system 42 of the APU 16 or an external AC power source, such as a ground cart, through an AVF AC port 46. The AVF AC power is coupled to the AVF AC starter/generator 18 of each engine 14 through respective AVF AC power buses 48. The AVF AC power generation system 42 may also be used to power on-board electrical components that require AVF AC power, such as ECS motors. Such components are coupled to each AVF AC power bus 48.

In addition, during start-up, on-board electrical components that accept VF AC may be supplied power by the CF AC generation system 44 or an external AC power source, such as a ground cart, through a VF AC port 50. The VF AC power is coupled to the on-board VF AC components through VF AC power buses 52 for each CF AC power generation system 40.

As each engine 14 reaches self-sustaining speed, its respective AVF AC starter/generator system 38 generates power through its respective AVF AC power bus 48 for use by on-board AVF AC electrical components. Similarly, the VF AC power generation system 40 for each engine 14 generates power through its respective VF AC power bus 52 for use by on-board VF AC electrical components.

Advantages of the mixed architecture AVFNF starter/generator electrical system 36 are three fold. First, the AVF starter/generator system 38 for each engine 14 allows electric starting so that no separate pneumatic starting system is required. That allows the use of a no-bleed air design for the aircraft. Second, the AVF AC power starter/generators provide AVF AC power to high-power on-board electrical components that require AVF AC power according to flight requirements, such as ECS motors, thus eliminating the need for large motor controllers in the architecture. Third, the VF AC generation systems 40 for each engine 14 provide VF AC power to the remainder of the on-board electrical components, such as fans, pumps and on-board electronics. Since VF AC power generation systems 40 are less costly and complex than comparable CF AC and AVF AC power systems, cost, complexity and weight of the mixed architecture AVFNF starter/generator electrical system 36 is reduced.

Figure 3:
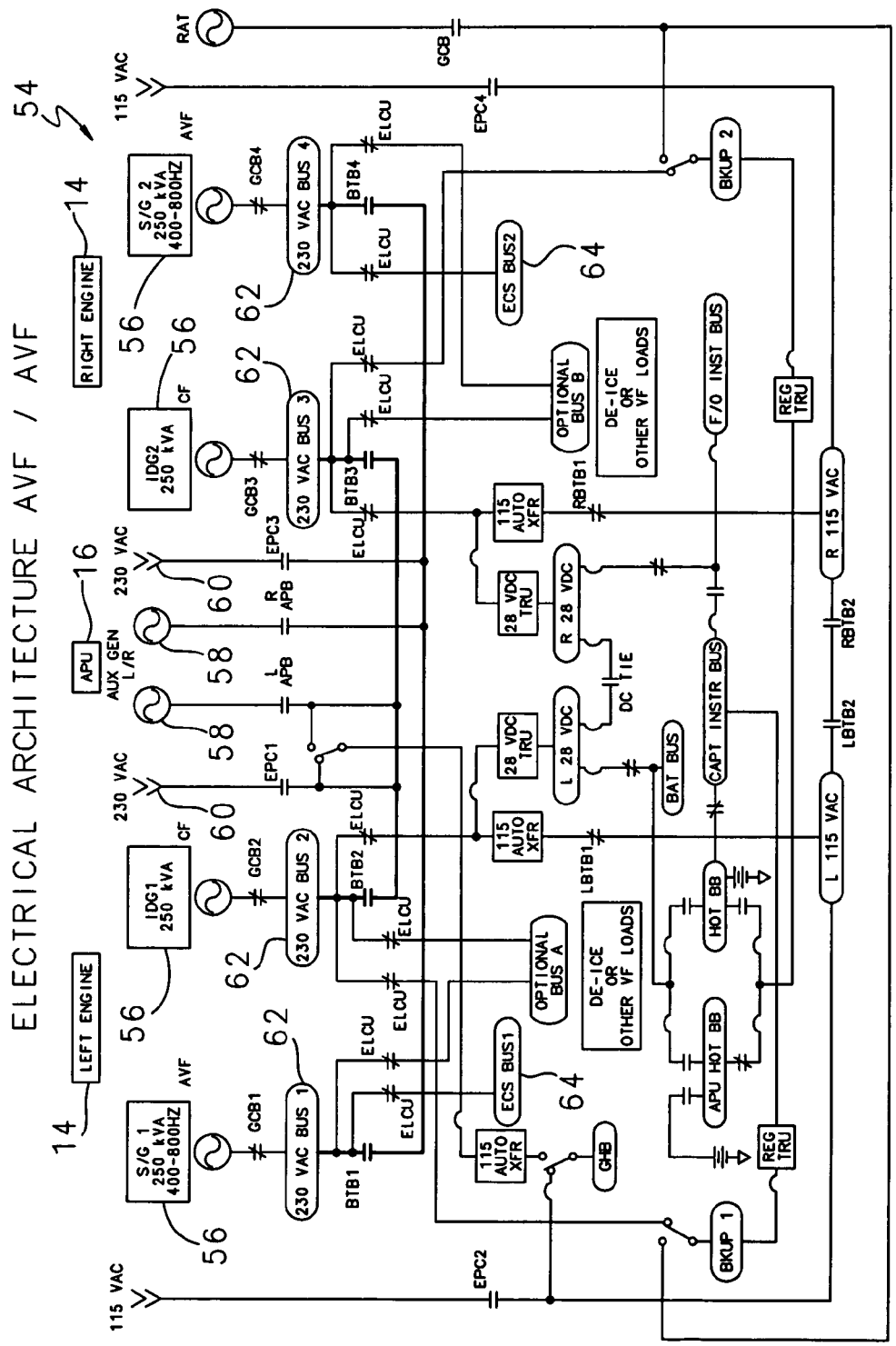
FIG. 3 is a schematic representation of an aircraft starter/generator electrical system that has multiple independent AVF AC power systems for redundancy.

FIG. 3 is a schematic representation of an aircraft starter/generator electrical system 54 that has multiple independent AVF AC power systems for redundancy. As shown by way of example, the system 54 comprises an architecture for an aircraft that has two gas turbine powered propulsion engines 14 and an auxiliary power unit (APU) 16, although the system 54 may be used with other aircraft configurations, as shall be appreciated by those skilled in the art.

Each of the engines 14 couples to multiple redundant AVF AC starter/generator systems 56, such as the AVF AC starter/generator system described in Hoppe et al. By way of example, two AVF AC starter/generator systems 56 are shown for each of the engines 14. Likewise, the APU 16 has redundant AVF AC power generation systems 58, and two of the AVF power generation systems 58 are shown by way of example.

Each of the engines 14 may be started by AC power supplied by one of the AVF AC power generation systems 58 of the APU 16 or an external AC power source, such as a ground cart, through a respective AVF AC port 60. The AVF AC power is coupled to one of the AVF AC starter/generators 56 of each engine 14 through a respective AVF AC power bus 62. The AVF AC power generation system 58 may also be used to power on-board electrical components that require AVF AC power, such as ECS motors. Such components are coupled to each AVF AC power bus 62 through a respective AVF AC components power bus 64.

Either one of the AVF AC starter/generator systems 56 may be used to start each respective engine 14 by one of the AVF AC power generation systems 58 of the APU 16 or external power introduced through either one of the AVF AC ports. Thus, this aircraft starter/generator electrical system 54 provides redundant starting capability for each engine 14. Failure of at least one and as many as two of the four AVF AC starter/generator systems 56 may still allow normal starting of each engine 14.

As each engine 14 reaches self-sustaining speed, each of its respective AVF AC starter/generator system 56 generates power through its respective AVF AC power bus 62 for use by on-board AVF AC electrical components. Power for the on-board AVF AC electrical components may be distributed from each of the two AVF AC power buses 62 14 as desired. Since there are four of the AVF AC starter/generator systems 56 on-board, failure of as many as three of them in the generating mode may still provide sufficient power to operate the AVF AC on-board electrical components.

Advantages of the redundant AVF AC starter/generator electrical system 54 are three fold. First, the AVF starter/generator system 56 for each engine 14 allows electric starting so that no separate pneumatic starting system is required. That allows the use of a no-bleed air design for the aircraft. Second, the AVF AC power starter/generators provide AVF AC power to high-power on-board electrical components that require AVF AC power according to flight requirements, such as ECS motors, thus eliminating the need for large motor controllers in the architecture. Third, having redundant AVF AC starter/generator systems 56 for engine starting and generating redundancy for each engine 14.

Described above are preferred embodiments of a starter/generator electrical system for gas turbine engine powered aircraft with mixed power architecture to combine advantages of each. The mixed power architecture may be selected from CF, AVF and NRVF AC systems to suit aircraft requirements for on-board electric components and redundancy, with at least two separate power generation systems provided for each gas turbine engine on the aircraft. It should be understood that these embodiments of the invention are only illustrative implementations of the invention, that the various parts and arrangement thereof may be changed or substituted, and that the invention is only limited by the scope of the attached claims.

What is claimed is:

1. A starting and generating system for gas turbine engine powered aircraft comprising:
    a first electrical power generation system that provides adjustable variable frequency (AVF) alternating current (AC) coupled to each engine comprising a dynamo-electric machine for starting the engine and generating electrical power for a first group of on-board electrical components that require AVF AC power;
    a first electrical power bus coupled to each first electrical power generation system for distributing power from its respective first electrical power generation system to the first group of on-board electrical components; and
    a second electrical power generation system coupled to each engine for generating narrow range variable frequency (NRVF) AC electrical power for a second group of on-board electrical components that require NRVF AC power.

2. The system of claim 1, wherein each second power generation system comprises another AVF AC power generation system.

3. The system of claim 2, wherein the second group of on-board electrical components comprise electrical components that require AVF power generation system.

4. The system of claim 1, further comprising an auxiliary power unit (APU) with a first power generation system for supplying AVF AC power for starting each engine with the dynamoelectric machine of its coupled first power generation system and powering the first group of on-board electrical components through the first electrical power bus; and a second power generation system for supplying power to the second group of on-board electrical components through each second electrical power bus;

wherein the second power generation system comprises a NRVF AC power generation system and the second group of on-board electrical components require NRVF AC power.

5. A starting and generating system for gas turbine engine powered aircraft comprising:

a first electrical power generation system coupled to each engine that provides adjustable variable frequency (AVF) alternating current (AC) comprising a dynamoelectric machine for starting the engine and generating electrical power for a first group of on-board electrical components that require AVF AC power;

a first electrical power bus coupled to each first electrical power generation system for distributing power from its respective first electrical power generation system to the first group of on-board electrical components;

a second electrical power generation system coupled to each engine for generating narrow range variable frequency (NRVF) AC electrical power for a second group of on-board electrical components that require NRVF AC power.

6. The system of claim 5, further comprising an auxiliary power unit (APU) with a first power generation system for supplying AVF AC power for starting each engine with the dynamoelectric machine of its coupled first power generation system and powering the first group of on-board electrical components through the first electrical power bus.

7. The system of claim 6, wherein the APU further comprises a second power generation system for supplying NRVF AC power to the second group of on-board electrical components through each second electrical power bus.

* * * * *